(12) United States Patent
Cheng et al.

(10) Patent No.: US 11,568,593 B2
(45) Date of Patent: Jan. 31, 2023

(54) THREE-DIMENSIONAL RECONSTRUCTION METHOD AND APPARATUS FOR MATERIAL PILE, ELECTRONIC DEVICE, AND COMPUTER-READABLE MEDIUM

(71) Applicant: BEIJING BAIDU NETCOM SCIENCE AND TECHNOLOGY CO., LTD., Beijing (CN)

(72) Inventors: Xinjing Cheng, Beijing (CN); Ruigang Yang, Beijing (CN); Feixiang Lu, Beijing (CN); Yajue Yang, Beijing (CN); Hao Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 559 days.

(21) Appl. No.: 16/676,281

(22) Filed: Nov. 6, 2019

(65) Prior Publication Data

US 2020/0242829 A1    Jul. 30, 2020

(30) Foreign Application Priority Data

Jan. 25, 2019   (CN) .......................... 201910075865.7

(51) Int. Cl.
| | | |
|---|---|---|
| *G06T 15/08* | (2011.01) | |
| *E02F 9/26* | (2006.01) | |
| *E02F 3/43* | (2006.01) | |
| *E02F 3/32* | (2006.01) | |

(52) U.S. Cl.
CPC .............. *G06T 15/08* (2013.01); *E02F 3/439* (2013.01); *E02F 9/262* (2013.01); *E02F 3/32* (2013.01); *G06T 2207/10028* (2013.01)

(58) Field of Classification Search
CPC ........... G06T 15/08; G06T 2207/10028; G06T 19/003; G06T 7/50; G06T 2211/416; E02F 3/439; E02F 3/32; E02F 9/262; E02F 9/205; E02F 9/261
USPC ......................................................... 701/50
See application file for complete search history.

(56) References Cited

U.S. PATENT DOCUMENTS

| | | | | |
|---|---|---|---|---|
| 9,300,954 | B2 * | 3/2016 | Tanizumi ............. | H04N 17/002 |
| 10,679,371 | B2 * | 6/2020 | Izumikawa .......... | H04N 5/2253 |
| 10,689,830 | B2 * | 6/2020 | Hageman ............... | G01C 11/06 |
| 11,414,837 | B2 * | 8/2022 | Kawamoto ............. | E02F 9/123 |

(Continued)

FOREIGN PATENT DOCUMENTS

| | | |
|---|---|---|
| JP | 10088625 A | 4/1998 |
| JP | 2000-192514 | 7/2000 |

(Continued)

*Primary Examiner* — Krishnan Ramesh
(74) *Attorney, Agent, or Firm* — Knobbe, Martens, Olson & Bear LLP (57) ABSTRACT

Embodiments of the present disclosure relate to a three-dimensional reconstruction method and apparatus for a material pile, an electronic device, and a computer-readable medium. The method may include: acquiring, in response to an instruction for controlling an excavator body of an excavator to rotate to transport materials being detected, a sequence of depth images of an excavated material pile collected by a binocular camera provided on a side of the excavator; and performing three-dimensional reconstruction based on the sequence of depth images of the material pile, to generate a three-dimensional model of the material pile.

19 Claims, 4 Drawing Sheets

(56) References Cited

U.S. PATENT DOCUMENTS

| | | | |
|---|---|---|---|
| 2003/0226290 | A1 | 12/2003 | Savard |
| 2014/0286536 | A1* | 9/2014 | Pettersson ............... G06T 17/00 382/106 |
| 2015/0249821 | A1* | 9/2015 | Tanizumi ............... G06T 7/593 348/46 |
| 2017/0089041 | A1 | 3/2017 | Kawamoto |
| 2018/0182120 | A1* | 6/2018 | Izumikawa ............. G06T 7/593 |
| 2020/0040555 | A1* | 2/2020 | Hageman ................. G01C 9/06 |
| 2021/0292998 | A1* | 9/2021 | Kawamoto ............... G06T 7/73 |

FOREIGN PATENT DOCUMENTS

| | | |
|---|---|---|
| JP | 2010-198519 | 9/2010 |
| JP | 2015198410 | 11/2015 |
| JP | 2016065422 | 4/2016 |
| JP | 2017-025503 | 2/2017 |
| JP | 2018181271 | 11/2018 |
| JP | 2019002242 | 1/2019 |
| JP | 2019007348 | 1/2019 |
| KR | 20090015354 | 2/2009 |
| KR | 20100002896 | 1/2010 |
| WO | WO2015/198410 | 12/2015 |
| WO | WO2017033991 | 3/2017 |
| WO | WO2018079789 A1 | 5/2018 |

\* cited by examiner

THREE-DIMENSIONAL RECONSTRUCTION METHOD AND APPARATUS FOR MATERIAL PILE, ELECTRONIC DEVICE, AND COMPUTER-READABLE MEDIUM

CROSS-REFERENCE TO RELATED APPLICATION

This application claims priority to Chinese Patent Application No. 201910075865.7, filed with the China National Intellectual Property Administration (CNIPA) on Jan. 25, 2019, the content of which is incorporated herein by reference in its entirety.

TECHNICAL FIELD

Embodiments of the present disclosure relate to the field of computer technology, specifically to the field of three-dimensional modeling, and more specifically to a three-dimensional reconstruction method and apparatus for a material pile, an electronic device, and a computer-readable medium.

BACKGROUND

Unmanned excavator is an intelligent excavating device that perceives an object of the excavating operation through various sensors, plans operation behaviors, and executes operation instructions. During excavation, the unmanned excavator needs to acquire relevant information of the excavated object (such as a pile of soil), for example, to acquire information such as location, volume, or form of the excavated object. A laser radar maybe provided on the unmanned excavator to scan three-dimensional information of the excavated object such as a pile of soil, or a monocular camera is suspended above the excavated object, and the information of the excavated object such as a pile of soil is extracted from the acquired image.

SUMMARY

Embodiments of the present disclosure provide a three-dimensional reconstruction method and apparatus for a material pile, an electronic device, and a computer-readable medium.

According to a first aspect, some embodiments of the present disclosure provide a three-dimensional reconstruction method for a material pile, including: acquiring, in response to an instruction for controlling an excavator body of an excavator to rotate to transport materials being detected, a sequence of depth images of an excavated material pile collected by a binocular camera provided on a side of the excavator; and performing three-dimensional reconstruction based on the sequence of depth images of the material pile, to generate a three-dimensional model of the material pile.

In some embodiments, the acquiring, in response to an instruction for controlling an excavator body to rotate to transport materials being detected, a sequence of depth images of an excavated material pile collected by a binocular camera provided on a side of the excavator includes: turning on, in response to the instruction for controlling the excavator body to rotate to transport materials being detected, the binocular camera provided on the side of the excavator; and acquiring the sequence of depth images of the excavated material pile, the sequence of depth images of the excavated material pile being collected by the binocular camera during the rotation of the excavator body to transport materials.

In some embodiments, binocular cameras are provided on both sides of the excavator, the turning on, in response to the instruction for controlling the excavator body to rotate to transport materials being detected, the binocular camera provided on the side of the excavator includes: determining, in response to the instruction for controlling the excavator body to rotate to transport materials being detected, a binocular camera provided on the side turned to the material pile according to the rotation direction of the excavator body, and issuing a turn-on instruction to the binocular camera on the side turned to the material pile.

In some embodiments, the method further includes: turning off, in response to an instruction for controlling a bucket of the excavator to unload materials being detected, the binocular camera provided on the side of the excavator.

In some embodiments, the performing three-dimensional reconstruction based on the sequence of depth images of the material pile, to generate a three-dimensional model of the material pile includes: converting the sequence of depth images of the material pile into a sequence of three-dimensional point clouds; fusing the sequence of three-dimensional point clouds based on overlaps of adjacent images in the sequence of depth images, to obtain a fused three-dimensional point cloud of the material pile; and generating the three-dimensional model of the material pile based on the three-dimensional point cloud of the material pile.

In some embodiments, the above method further includes: planning, according to the three-dimensional model of the material pile, an excavation operation for excavating the material pile, and generating an instruction for excavating.

According to a second aspect, some embodiments of the present disclosure provide a three-dimensional reconstruction apparatus for a material pile, including: an acquiring unit, configured to acquire, in response to an instruction for controlling an excavator body of an excavator to rotate to transport materials being detected, a sequence of depth images of an excavated material pile collected by a binocular camera provided on a side of the excavator; and a generating unit, configured to perform three-dimensional reconstruction based on the sequence of depth images of the material pile to, generate a three-dimensional model of the material pile.

In some embodiments, the acquiring unit is configured to acquire, in response to the instruction for controlling the excavator body of the excavator to rotate to transport materials, the sequence of depth images of the excavated material pile collected by the binocular camera provided on the side of the excavator by the following way: turning on, in response to the instruction for controlling the excavator body to rotate to transport materials being detected, the binocular camera provided on the side of the excavator; and acquiring the sequence of depth images of the excavated material pile, the sequence of depth images of the excavated material pile being collected by the binocular camera during the rotation of the excavator body to transport materials.

In some embodiments, binocular cameras are provided on both sides of the excavator, the acquiring unit is further configured to turn on the binocular camera provided on a side of the excavator by the following way: determining, in response to the instruction for controlling the excavator body to rotate to transport materials being detected, a binocular camera provided on the side turned to the material pile according to the rotation direction of the excavator body, and issuing a turn-on instruction to the binocular camera on the side turned to the material pile.

In some embodiments, the apparatus further includes: a turn-off unit configured to turn off, in response to an instruction for controlling a bucket of the excavator to unload materials being detected, the binocular camera provided on the side of the excavator.

In some embodiments, the generating unit is configured to perform three-dimensional reconstruction based on the sequence of depth images of the material pile, to generate a three-dimensional model of the material pile by the following way: converting the sequence of depth images of the material pile into a sequence of three-dimensional point clouds; fusing the sequence of three-dimensional point clouds based on overlaps of adjacent images in the sequence of depth images, to obtain a fused three-dimensional point cloud of the material pile; and generating the three-dimensional model of the material pile based on the three-dimensional point cloud of the material pile.

In some embodiments, the apparatus further includes: a planning unit configured to plan, according to the three-dimensional model of the material pile, an excavation operation for excavating the material pile, and generate an instruction for excavating.

According to a third aspect, some embodiments of present disclose provide an electronic device, includes: one or more processors; and a storage apparatus, configured to store one or more programs, the one or more programs, when executed by the one or more processors, cause the one or more processors to implement the three-dimensional reconstruction method for a material pile according to the first aspect.

According to a fourth aspect, some embodiments of the present disclosure provide a computer-readable medium, storing a computer program thereon, wherein the program, when executed by a processor, causes the processor to implement the the three-dimensional reconstruction method for a material pile according to the first aspect.

The three-dimensional reconstruction method for a material pile provided in the above embodiments of the present disclosure, a sequence of depth images of an excavated material pile collected by a binocular camera provided on a side of an excavator is acquired in response to an instruction for controlling the excavator body of the excavator to rotate to transport materials being detected, and three-dimensional reconstruction is performed based on the sequence of depth images of the material pile to generate a three-dimensional model of the material pile. Therefore a binocular camera which is set based on the rotating operation characteristic of the excavator and thus is not easily occluded by components such as a mechanical arm are used for collecting depth images of the material pile and three-dimensional modeling, thereby loss of image information of the material pile due to occlusion is avoided, and the accuracy of the three-dimensional reconstruction of the material pile is improved, and at the same time, cost is saved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
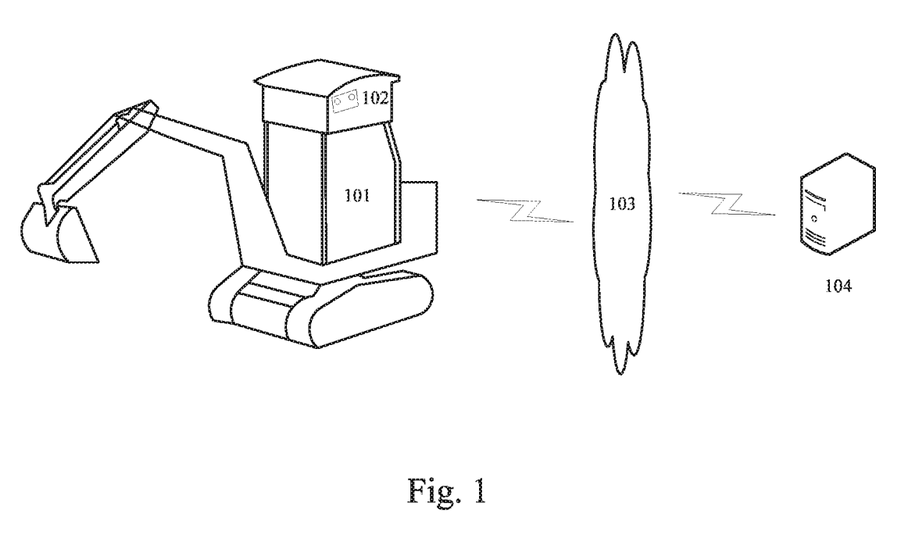
FIG. 1 is an architectural diagram of an example system in which some embodiments of the present disclosure may be implemented.

FIG. 1 shows an example system architecture to which a three-dimensional reconstruction method for a material pile or a three-dimensional reconstruction apparatus for a material pile may be applied.

As shown in FIG. 1, the system architecture 100 may include an excavator 101, a binocular camera 102 provided on the excavator, a network 103, and a server 104. The network 103 serves as a medium providing a communication link among the excavator 101, the binocular camera 102, and the server 104. The network 103 may include various types of connections, such as wired or wireless communication links, or optical fiber cables.

The excavator 101 may be an unmanned autonomous excavator, and various sensors such as an angle sensor, a mechanical sensor, or an image sensor may be provided on the unmanned autonomous excavator. The various sensors on the excavator 101 may perceive environmental information including an excavated object, a road environment, and the like. In some scenarios, the unmanned autonomous excavator 101 may also be provided with a data processing unit such as a CPU or a GPU, and a storage unit. The data processing unit may acquire and process the data perceived by the sensors, and the storage unit may store the data perceived by the sensors and the data called by the data processing unit for data processing.

The binocular camera 102 may be an image sensor mounted on the unmanned excavator 101, and is capable of collecting an image of a material pile to be excavated by the unmanned excavator. The binocular camera 102 may be mounted on a side of the body of the unmanned excavator. The binocular camera may collect a depth image of the material pile during the body rotates or unloads the materials in a bucket.

The server 104 may be a server for providing various services, e.g., a backend server of the unmanned autonomous excavator. The backend server of the unmanned excavator may analyze and process data such as a two-dimensional image of the material pile acquired from the binocular camera 102, and control the excavation of the excavator 101 based on the processing result (for example, a target excavating point and a target excavating trajectory).

It should be noted that the server 104 may be hardware or software. When the server 104 is hardware, the server 104 may be implemented as a distributed server cluster composed of multiple servers, or as a single server. When the server 104 is software, the server 104 may be implemented as a plurality of software programs or software modules (e.g., a plurality of software programs or software modules for providing distributed services), or as a single software program or software module. Specific limitations are not provided here.

It should be noted that the three-dimensional reconstruction method for a material pile according to some embodiments of the present disclosure may be performed by the data processing unit of the excavator 101 or the server 104.

Accordingly, the three-dimensional reconstruction apparatus for a material pile may be provided in the data processing unit of the excavator 101 or the server 104.

It should be appreciated that the numbers of the camera, the network, and the server in FIG. 1 are merely illustrative. Any number of cameras, networks, and servers may be provided based on implementation requirements.

Figure 2:
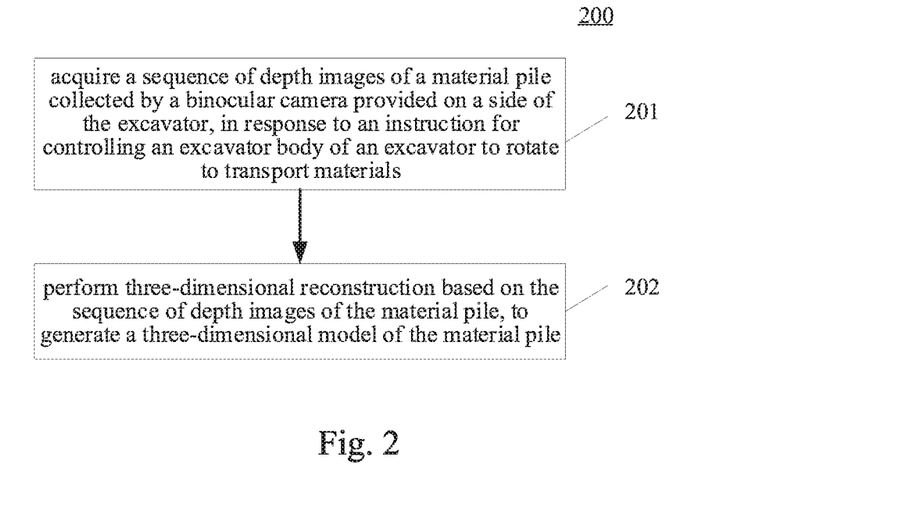
FIG. 2 is a flowchart of a three-dimensional reconstruction method for a material pile according to an embodiment of the present disclosure.

Further referring to FIG. 2, a flow 200 of a three-dimensional reconstruction method for a material pile according to an embodiment of the present disclosure is shown. The three-dimensional reconstruction method for a material pile includes the following steps.

Step 201: acquiring, in response to an instruction for controlling an excavator body of an excavator to rotate to transport materials being detected, a sequence of depth images of an excavated material pile collected by a binocular camera provided on a side of the excavator.

In the present embodiment, the executing body (for example, the server 104 or the processing unit on the excavator 101 shown in FIG. 1) of the three-dimensional reconstruction method for a material pile may detect control instructions of the excavator in real time, and may acquire, when the instruction for controlling the body of the excavator to rotate to transport materials in a bucket being detected, the sequence of depth images of the excavated material pile collected by the binocular camera provided on the side of the excavator. The material pile may be an operated object of the excavator, such as a soil pile, a sand pile, a rock pile, or a building material pile.

The excavator may be an unmanned autonomous excavator, and the binocular camera may be provided on a side of the excavator. Here, the front side of the excavator refers to the side faces the advancing direction of tires or crawlers of the excavator, and the side of the excavator refers to the side perpendicular to the front side of the excavator. After the excavator controls the bucket to shovel the materials from the excavated material pile, the body needs to be rotated about a vertical line perpendicular to the ground to transport the materials to other place. While the front side of the excavator body is rotated away from the excavated material pile, a side of the excavator body is turned to the excavated material pile, and the binocular camera provided on the side of the excavator body is rotated to the side facing the material pile accordingly. At this time, the binocular camera may acquire a sequence of depth images of the material pile and transmit the sequence of depth images to the executing body.

Since a mechanical arm of the excavator is usually located on the front side of the excavator body, the mechanical arm is also rotated away when the front side of the excavator body is rotated away from the excavated material pile. In this way, occlusion on the material pile by the mechanical arm does not occur in the images collected by the binocular camera on a side of the excavator.

A binocular camera may collect images containing depth information, i.e., depth images. The binocular camera may be composed of two cameras having a calibrated relative positional relationship. In some embodiments, the binocular camera may further include a processing unit for fusing planar images collected by the two cameras to form the depth images.

In practice, a remote server or the processing unit provided on the excavator can control the excavation of the excavator. When the bucket shovels the materials and is ready for transportation, the remote server or the processing unit provided on the excavator may issue an instruction to control the excavator body to rotate to transport the materials. At this time, the executing body may acquire, in response to this instruction being detected, a sequence of images collected by the binocular camera after the instruction is issued, that is, acquire a sequence of depth images of the material pile collected by the binocular camera during rotation of the excavator body.

Step 202: performing three-dimensional reconstruction based on the sequence of depth images of the material pile, to generate a three-dimensional model of the material pile.

In the present embodiment, the three-dimensional reconstruction may be performed based on the sequence of depth images of the material pile acquired instep 201. Specifically, for a depth image in the sequence of depth images, image information points in the depth image may be mapped to a three-dimensional space based on an external parameter matrix (e.g., a rotation matrix, a translation matrix, etc.) of the binocular camera, and then the points obtained by the mapping in the three-dimensional space are connected to form a three-dimensional model corresponding to the depth image. Then, the three-dimensional models formed by the different depth images in the sequence of depth images are fused to obtain a three-dimensional model corresponding to the sequence of depth images.

In some alternative implementations of the present embodiment, the three-dimensional reconstruction may be performed based on the sequence of depth images of the material pile to generate the three-dimensional model of the material pile by the following way: first converting the sequence of depth images of the material pile into a sequence of three-dimensional point clouds, then fusing the sequence of three-dimensional point clouds based on the overlaps of adjacent images in the sequence of depth images to obtain a fused three-dimensional point cloud of the material pile, and finally generating the three-dimensional model of the material pile based on the three-dimensional point cloud of the material pile.

Specifically, in the above implementations, two-dimensional images maybe converted into three-dimensional point clouds based on depth information in the depth images by using a conversion matrix between image coordinate system and world coordinate system. That is, each point in the two-dimensional images is mapped into a three-dimensional space to obtain a sequence of three-dimensional point clouds in one-to-one correspondence with the depth images in the sequence of depth images. Then, feature points extraction and match are performed on the overlaps parts of adjacent images in the sequence of depth images based on SIFT (Scale-invariant feature transform) or other method, and the three-dimensional point clouds corresponding to the adjacent images are sequentially fused according to the matching feature points between adjacent images, to obtain a complete three-dimensional point cloud of the material pile. Thereafter, the three-dimensional point cloud may be preprocessed to remove noise points, and perform data interpolation. Finally, the point cloud is triangularly gridded, and the triangular grids are rendered to obtain the three-dimensional model of the material pile.

Here, the three-dimensional model of the material pile may be composed of a three-dimensional vertex and faces in the three-dimensional space. The three-dimensional model may be characterized by the coordinates of the three-dimensional vertex and the mathematical expression of the faces.

Figure 3:
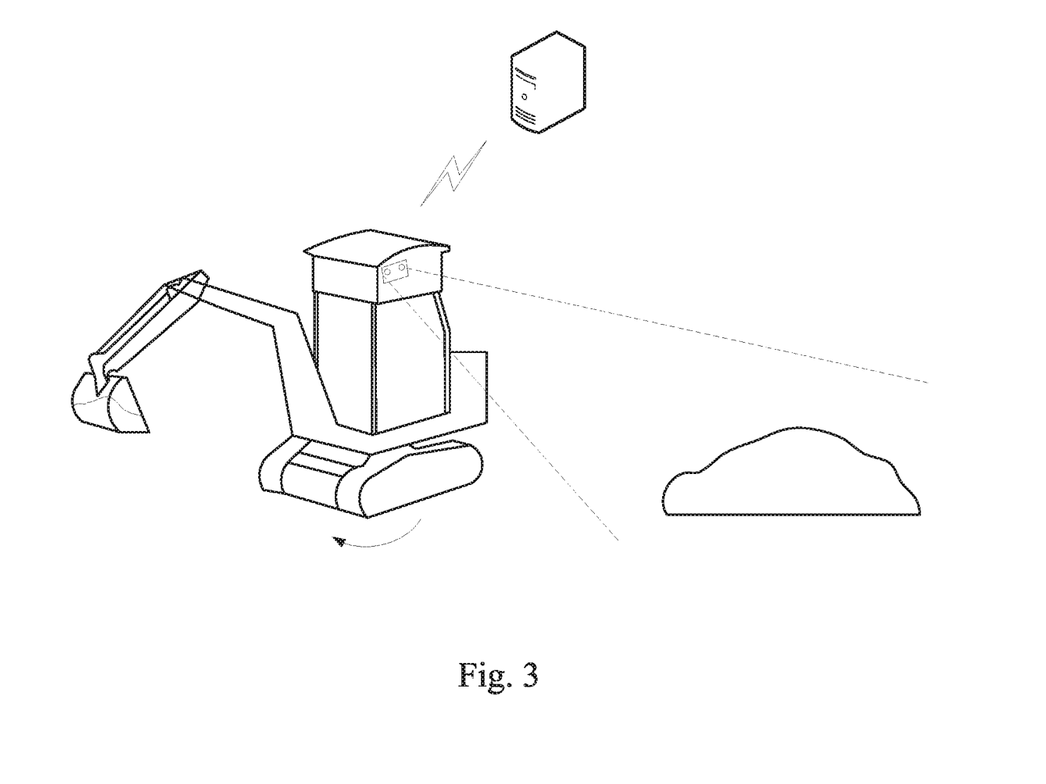
FIG. 3 is a schematic diagram of an application scenario of the embodiment shown in FIG. 2.

Referring to FIG. 3, a schematic diagram of an application scenario of the three-dimensional reconstruction method for a material pile as shown in FIG. 2 is shown. As shown in FIG. 3, when the bucket of the excavator shovels materials and the excavator body is rotated along the direction of the arrow in the figure to transport the materials, the binocular camera provided on a side of the excavator may collect depth images within its imaging region (the dotted region as shown in FIG. 3). Since the excavated material pile is located within the imaging region of the binocular camera, the depth images of the material pile can be acquired. Thereafter, the server for controlling the excavator may perform three-dimensional reconstruction according to the depth images, to obtain a three-dimensional model of the material pile. In this way, when next excavation is performed, a decision may be made according to the three-dimensional model of the material pile.

According to the three-dimensional reconstruction method for a material pile in the above embodiments of the present disclosure, a sequence of depth images of an excavated material pile collected by a binocular camera provided on a side of an excavator is acquired in response to an instruction for controlling the excavator body of the excavator to rotate to transport materials being detected, and three-dimensional reconstruction is performed based on the sequence of depth images of the material pile to generate a three-dimensional model of the material pile. Therefore a binocular camera which is set based on the rotating operation characteristic of the excavator and thus is not easily occluded by components such as a mechanical arm are used for collecting depth images of the material pile and three-dimensional modeling, thereby loss of image information of the material pile due to occlusion is avoided, complete details are obtained, and the accuracy of the three-dimensional reconstruction of the material pile is improved. Compared with the acquisition of three-dimensional information of a material pile by a laser radar or an unmanned aerial vehicle, the binocular camera is low in cost, and the generation of the three-dimensional model is faster.

In some alternative implementations of the above embodiments, step 201 of acquiring, in response to the instruction for controlling the excavator body of the excavator to rotated to transport materials being detected, the sequence of depth images of the excavated material pile collected by the binocular camera provided on a side of the excavator may be performed by the following way: turning on, in response to the instruction for controlling the excavator body to rotate transport materials being detected, the binocular camera provided on a side of the excavator, to acquire the sequence of depth images of the excavated material pile collected by the binocular camera during the rotation of the excavator body to transport materials.

Specifically, control instructions sent to the excavator may be detected in real time. When an instruction for controlling the excavator body to rotate to transport materials is detected, a turn-on instruction may be issued to the binocular camera provided on a side of the excavator. The binocular camera begins to collect images within its imaging range after receiving the turn-on instruction. During the rotation of the body to transport materials, the binocular camera continues to collect images of the material pile at certain frequency to form an image sequence.

Further, in some alternative implementations of the above embodiments, the binocular cameras are provided on both sides of the excavator, and the sequence of depth images of the excavated material pile maybe collected by the binocular camera provided on a side of the excavator by the following way: in response to the instruction for controlling the excavator body to rotate to transport materials, determining the binocular camera provided on the side turned to the material pile according to the rotation direction of the excavator body, and issuing a turn-on instruction to the binocular camera on the side turned to the material pile, to acquire the sequence of depth images of the excavated material pile collected by the binocular camera during the rotation of the body of the excavator to transport materials.

When the instruction for controlling the excavator body to rotate to transport materials is detected, the rotation direction of the excavator body indicated by the instruction maybe acquired, the binocular camera turned to the side facing the material pile, that is, the binocular camera whose imaging range covers the excavated materials pile after the excavator body rotates, is determined according to the acquired rotation direction, and the binocular camera is turned on to collect the sequence of depth images of the material pile.

Figure 4:
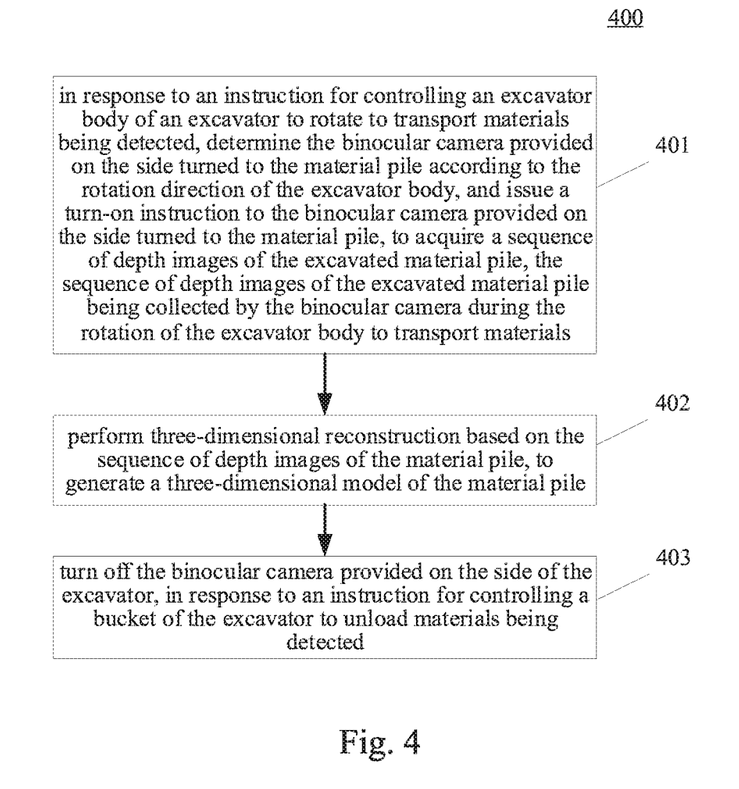
FIG. 4 is a flowchart of the three-dimensional reconstruction method for a material pile according to another embodiment of the present disclosure.

Further referring to FIG. 4, a flow of the three-dimensional reconstruction method for a material pile according to another embodiment of the present disclosure is shown. As shown in FIG. 4, the flow 400 of the three-dimensional reconstruction method for a material pile may include the following steps.

Step 401: determining, in response to an instruction for controlling an excavator body of an excavator to rotate to transport materials, a binocular camera provided on a side turned to a material pile according to the rotation direction of the excavator body, and issuing a turn-on instruction to the binocular camera provided on the side turned to the material pile, to acquire a sequence of depth images of the excavated material pile collected by the binocular camera during the rotation of the excavator body to transport materials.

In the present embodiment, binocular cameras are provided on both sides of the excavator. When the instruction for controlling the excavator body of the excavator to rotate to transport materials is detected, the rotation direction of the excavator body indicated by the instruction may be acquired, the binocular camera turned to the side facing the material pile is determined according to the rotation direction, and the turn-on instruction is issued to the binocular camera turned to the side facing the material pile. Alternatively, the sequence of depth images of the material pile collected by the binocular camera turned to the side facing the material pile during the rotation of the excavator body is acquired.

In practice, normally the position of the material pile does not change during excavation. When the excavator rotates to the right, the binocular camera provided on the left side of the excavator is turned to face the material pile, and the binocular camera provided on the right side of the excavator is turned away from the material pile. At this time, images of the material pile may be collected by the binocular camera provided on the left side of the excavator while the excavator is turning to the right to transport materials in the bucket, and the binocular camera provided on the right side may be kept at a turned off state. Conversely, when the excavator is turned to the left, the binocular camera provided on the right side of the excavator is turned to face the material pile, and the binocular camera provided on the left side of the excavator is turned away from the material pile. At this time, images of the material pile maybe collected by the binocular camera provided on the right side while the excavator is turning to the left to transport materials in the bucket, and the binocular camera provided on the left side may be kept at a turned off state. In this way, the images of the material pile may be collected by the binocular cameras no matter what direction the excavator is turned to.

Step 402: performing three-dimensional reconstruction based on the sequence of depth images of the material pile, to generate a three-dimensional model of the material pile.

In the present embodiment, the three-dimensional reconstruction may be performed based on the sequence of depth images of the material pile acquired in step 401. Specifically, for a depth image in the sequence of depth images, image information points in the depth image may be mapped to a three-dimensional space based on an external parameter matrix (e.g., a rotation matrix, a translation matrix, etc.) of the binocular camera, and then the points obtained by the mapping in the three-dimensional space are connected to form a three-dimensional model corresponding to the depth image. Then, three-dimensional models formed by different depth images in the sequence of depth images are fused to obtain a three-dimensional model corresponding to the sequence of depth images.

In some alternative implementations of the present embodiment, the three-dimensional reconstruction may be performed based on the sequence of depth images of the material pile to generate the three-dimensional model of the material pile by the following way: first converting the sequence of depth images of the material pile into a sequence of three-dimensional point clouds, then fusing the sequence of three-dimensional point clouds based on the overlaps of adjacent images in the sequence of depth images, to obtain a fused three-dimensional point cloud of the material pile, and finally generating the three-dimensional model of the material pile based on the three-dimensional point cloud of the material pile.

Specifically, in the above implementations, two-dimensional images maybe converted into three-dimensional point clouds based on depth information in the depth images by using a conversion matrix between image coordinate system and world coordinate system. That is, each point in the two-dimensional images is mapped into a three-dimensional space to obtain a sequence of three-dimensional point clouds in one-to-one correspondence with the depth images in the sequence of depth images. Then, feature points extraction and match are performed on the overlaps parts of adjacent images in the sequence of depth images based on SIFT (Scale-invariant feature transform) or other method, and the three-dimensional point clouds corresponding to the adjacent images are sequentially fused according to the matching feature points between adjacent images, to obtain a complete three-dimensional point cloud of the material pile. Thereafter, the three-dimensional point cloud may be preprocessed to remove noise points, and perform data interpolation. Finally, the point cloud is triangularly gridded, and the triangular grids are rendered to obtain the three-dimensional model of the material pile.

Step 403: turning off, in response to an instruction for controlling a bucket of the excavator to unload materials, the binocular camera provided on the side of the excavator.

In the present embodiment, the executing body of the three-dimensional reconstruction method for a material pile may turn off, when the instruction for controlling the bucket of the excavator to unload materials is detected, the enabled binocular camera to stop collecting images of the material pile. All the images collected by the binocular camera from on to off of the binocular camera can be used as an collected image sequence of the material pile.

Generally, when the instruction for controlling the bucket of the excavator to unload materials is generated, the bucket of the excavator has been moved to an unloading zone for unloading. Since a next excavation is about to be performed, and the three-dimensional information of the current material pile needs to be learned for making a decision for the next excavation, the collection of images of the material pile may be stopped, that is, to complete the collection of the sequence of depth images of the current material pile. The collection of images may be completed by turning off the binocular camera which is turned on in step 401, specifically by issuing a turn-off instruction to the enabled binocular camera.

In this way, the binocular camera is turned on and off once respectively when the bucket shovels materials and the excavator is rotated to transport the materials to the unloading zone for unloading, so that the collection time of images of the material pile excavated at different time can be cut, and the binocular camera is only turned on when its imaging range covers the material pile, but turned off at other time to save energy.

In some alternative implementations of the embodiments described above in connection with FIG. 2 and FIG. 4, the three-dimensional reconstruction method for a material pile may further include: planning, according to the three-dimensional model of the material pile, an excavation operation for excavating the material pile, and generating an instruction for excavating. After the three-dimensional reconstruction of the material pile is completed, an excavating point and an excavating angle of next excavation action may be determined based on the information such as surface characteristics and volume of the material pile, and then the excavating instruction for controlling movement of the excavator and the bucket to the corresponding excavating point and control the bucket to excavated at the excavating angle is generated. The excavator may perform corresponding excavation action after receiving the instruction. In this way, a decision on excavation action is made based on the three-dimensional reconstruction result of the excavated material pile, and the autonomous excavating function of the unmanned autonomous excavator is realized.

Figure 5:
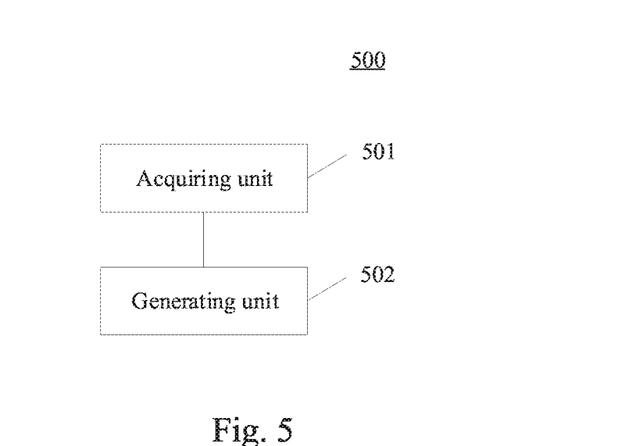
FIG. 5 is a schematic structural diagram of a three-dimensional reconstruction apparatus for a material pile according to an embodiment of the present disclosure.

Further referring to FIG. 5, as an implementation of the method shown in the above figures, the present disclosure provides an embodiment of a three-dimensional reconstruction apparatus for a material pile. The embodiment of the apparatus corresponds to the embodiments of the methods shown in FIG. 2 and FIG. 4, and the apparatus may be applied to various electronic devices.

As shown in FIG. 5, the three-dimensional reconstruction apparatus 500 for a material pile includes an acquiring unit 501 and a generating unit 502. The acquiring unit 501 is configured to acquire, in response to an instruction for controlling an excavator body of an excavator to rotate to transport materials being detected, a sequence of depth images of an excavated material pile collected by a binocular camera provided on a side of the excavator; and the generating unit 502 is configured to perform three-dimensional reconstruction based on the sequence of depth images of the material pile, to generate a three-dimensional model of the material pile.

In some embodiments, the acquiring unit 501 may be configured to acquire, in response to the instruction for controlling the excavator body of the excavator to rotate to transport materials, the sequence of depth images of the excavated material pile collected by the binocular camera provided on the side of the excavator by the following way: turning on, in response to the instruction for controlling the excavator body to rotate to transport materials being detected, the binocular camera provided on the side of the excavator; and acquiring the sequence of depth images of the excavated material pile, the sequence of depth images of the excavated material pile being collected by the binocular camera during the rotation of the excavator body to transport materials.

In some embodiments, binocular cameras are provided on both sides of the excavator; the acquiring unit 501 may be further configured to turn on the binocular camera provided on a side of the excavator by the following way: determining, in response to the instruction for controlling the excavator body to rotate to transport materials being detected, a binocular camera provided on the side turned to the material pile according to the rotation direction of the excavator body, and issuing a turn-on instruction to the binocular camera on the side turned to the material pile.

In some embodiments, the apparatus 500 may further include: a turn-off unit configured to turn off, in response to an instruction for controlling a bucket of the excavator to unload materials being detected, the binocular camera provided on the side of the excavator.

In some embodiments, the generating unit 502 may be configured to perform three-dimensional reconstruction based on the sequence of depth images of the material pile, to generate a three-dimensional model of the material pile by the following way: converting the sequence of depth images of the material pile into a sequence of three-dimensional point clouds; fusing the sequence of three-dimensional point clouds based on overlaps of adjacent images in the sequence of depth images, to obtain a fused three-dimensional point cloud of the material pile; and generating the three-dimensional model of the material pile based on the three-dimensional point cloud of the material pile.

In some embodiments, the apparatus 500 may further include: a planning unit configured to plan, according to the three-dimensional model of the material pile, an excavation operation for excavating the material pile, and generate an instruction for excavating.

It should be understood that the units described in the apparatus 500 may correspond to the respective steps in the methods described with reference to FIG. 2 and FIG. 4. Therefore, the operations and characteristics described above for the method are also applicable to the apparatus 500 and the units included therein, and details are not described herein again.

According to the three-dimensional reconstruction apparatus 500 for a material pile in the above embodiment of the present disclosure, a sequence of depth images of an excavated material pile collected by a binocular camera provided on a side of an excavator is acquired in response to an instruction for controlling the excavator body of the excavator to rotate to transport materials being detected, and three-dimensional reconstruction is performed based on the sequence of depth images of the material pile to generate a three-dimensional model of the material pile. Therefore a binocular camera which is set based on the rotating operation characteristic of the excavator and thus is not easily occluded by components such as a mechanical arm are used for collecting depth images of the material pile and three-dimensional modeling, thereby loss of image information of the material pile due to occlusion is avoided, complete details are obtained, and the accuracy of the three-dimensional reconstruction of the material pile is improved. Compared with the acquisition of three-dimensional information of a material pile by a laser radar or an unmanned aerial vehicle, the binocular camera is low in cost, and the generation of the three-dimensional model is faster.

Hereinafter referring to FIG. 6, a schematic structural diagram of an electronic device (e.g., the server in FIG. 1) 600 adapted to implement some embodiments of the present disclosure is shown. The server shown in FIG. 6 is merely an example, and should not limit the function and scope of use of the embodiments of the present disclosure.

Figure 6:
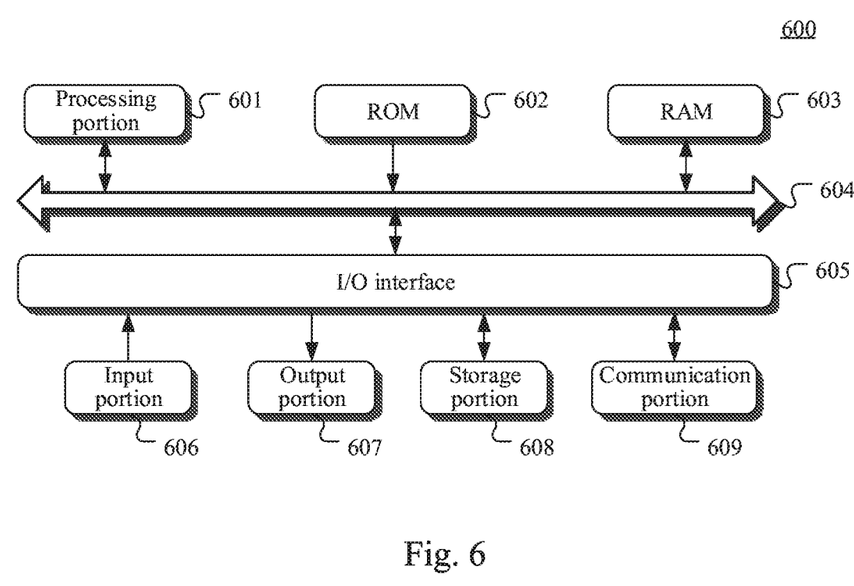
FIG. 6 is a schematic structural diagram of a computer system adapted to implement an electronic device of some embodiments of the present disclosure.

As shown in FIG. 6, the electronic device 600 may include a processing portion (e.g., a central processing unit, a Graphics Processing Unit, etc.) 601, which may execute various appropriate operations and processes according to a program stored in a read-only memory (ROM) 602 or a program loaded into a random access memory (RAM) 603 from a storage apparatus 608. The RAM 603 also stores various programs and data required by the operations of the electronic device 600. The processing portion 601, the ROM 602, and the RAM 603 are connected to each other through a bus 604. An input/output (I/O) interface 605 is also connected to the bus 604.

Generally, the following components may be connected to the I/O interface 605: an input portion 606 including a touch screen, a touch pad, a keyboard, a mouse, a camera, a microphone, an accelerometer, a gyroscope, or the like; an output portion 607 including a liquid crystal display (LCD), a speaker, a vibrator, or the like; a storage portion 608 including a hard disk or the like; and a communication portion 609. The communication portion 609 may allow wireless or wired communication between the electronic device 600 and other device to exchange data. Although FIG. 6 illustrates the electronic device 600 having various apparatuses, it should be understood that not all the illustrated portions are required to be implemented or included. More or less portions may be alternatively implemented or included. Each block shown in FIG. 6 may represent one apparatus or a plurality of apparatuses as required.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 609, or maybe installed from the storage portion 608, or may be installed from the ROM 602. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer-readable medium may be included in the electronic device, or exists alone and is not assembled into the electronic device. The computer-readable medium stores one or more programs. The one or more programs, when executed by the electronic device, cause the electronic device to: acquire, in response to an instruction for controlling an excavator body of an excavator to rotate to transport materials being detected, a sequence of depth images of an excavated material pile collected by a binocular camera provided on a side of the excavator; and perform three-dimensional reconstruction based on the sequence of depth images of the material pile, to generate a three-dimensional model of the material pile.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in some embodiments of the present disclosure maybe implemented by means of software or hardware. The described units may also be provided in a processor, for example, described as: a processor, including an acquiring unit and a generating unit. Here, the names of these units do not in some cases constitute a limitation to such units themselves. For example, the acquiring unit may also be described as "a unit configured to acquire, in response to an instruction for controlling r an excavator body of an excavator to rotate to transport materials being detected, a sequence of depth images of an excavated material pile collected by a binocular camera provided on a side of the excavator".

The above description only provides an explanation of some embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:
1. A three-dimensional reconstruction method for a material pile, applied to an unmanned autonomous excavator, where a binocular camera is provided on each of two side-surfaces of the excavator, and the two side-surfaces of the excavator are parallel to an advancing direction of the excavator, the method comprising:
in response to detecting an instruction for controlling an excavator body of the excavator to rotate to transport materials shoveled from the material pile, determining a side-surface turned to the material pile in the two side-surfaces according to a rotation direction of the excavator body, and performing a turning on operation on a binocular camera provided on the determined side-surface of the excavator while keeping a binocular camera provided on the other side-surface of the excavator in a turned off sate;
acquiring a sequence of depth images of the material pile collected by the turned on binocular camera provided on the determined side-surface of the excavator; and performing three-dimensional reconstruction based on the sequence of depth images of the material pile, to generate a three-dimensional model of the material pile.

2. The method according to claim 1, wherein acquiring a sequence of depth images of the material pile collected by the turned on binocular camera provided on the determined side-surface of the excavator comprises:
acquiring the sequence of depth images of the material pile, the sequence of depth images of the material pile being collected by the binocular camera during the rotation of the excavator body to transport materials shoveled from the material pile, wherein the rotation of the excavator is with a vertical line perpendicular to the ground as an axis and the front-side of the excavator body turns away from the material pile during rotation of the excavator body.

3. The method according to claim 2, wherein the method further comprises:
in response to detecting an instruction for controlling a bucket of the excavator to unload materials, turning off the binocular camera provided on the determined side-surface of the excavator.

4. The method according to claim 1, wherein the method further comprises:
excavating, by the excavator, the material pile based on the generated three-dimensional model of the material pile.

5. The method according to claim 4, wherein the excavating, by the excavator, the material pile based on the generated three-dimensional model of the material pile comprises:
planning, according to the three-dimensional model of the material pile, an excavation operation for excavating the material pile; and
excavating, by the excavator, the material pile according to the generated excavation operation.

6. The method according to claim 5, wherein excavation operation for excavating the material pile includes at least one of:
an excavating point, an excavating angle and an excavating trajectory.

7. The method according to claim 1, wherein the performing three-dimensional reconstruction based on the sequence of depth images of the material pile, to generate a three-dimensional model of the material pile comprises:
converting the sequence of depth images of the material pile into a sequence of three-dimensional point clouds;
fusing the sequence of three-dimensional point clouds based on overlaps of adjacent images in the sequence of depth images, to obtain a fused three-dimensional point cloud of the material pile; and
generating the three-dimensional model of the material pile based on the three-dimensional point cloud of the material pile.

8. A three-dimensional reconstruction apparatus for a material pile, applied to an unmanned autonomous excavator, where a binocular camera is provided on each of two side-surfaces of the excavator, and the two side-surfaces of the excavator are parallel to an advancing direction of the excavator, the apparatus comprising:
at least one processor; and
a memory storing instructions, the instructions when executed by the at least one processor, cause the at least one processor to perform operations, the operations comprising:
in response to detecting an instruction for controlling an excavator body of the excavator to rotate to transport materials shoveled from the material pile, determining a side-surface turned to the material pile in the two side-surfaces according to a rotation direction of the excavator body, and performing a turning on operation on a binocular camera provided on the determined side-surface of the excavator while keeping a binocular camera provided on the other side-surface of the excavator in a turned off sate;
acquiring a sequence of depth images of the material pile collected by the turned on binocular camera provided on the determined side-surface of the excavator; and
performing three-dimensional reconstruction based on the sequence of depth images of the material pile to, generate a three-dimensional model of the material pile.

9. The apparatus according to claim 8, wherein the acquiring a sequence of depth images of the material pile collected by the turned on binocular camera provided on the determined side-surface of the excavator comprises:
acquiring the sequence of depth images of the material pile, the sequence of depth images of the material pile being collected by the binocular camera during the rotation of the excavator body to transport materials shoveled from the material pile, wherein the rotation of the excavator is with a vertical line perpendicular to the ground as an axis and the front-side of the excavator body turns away from the material pile during rotation of the excavator body.

10. The apparatus according to claim 9, wherein the operations further comprise:
in response to detecting an instruction for controlling a bucket of the excavator to unload materials, turning off the binocular camera provided on the determined side-surface of the excavator.

11. The apparatus according to claim 8, wherein the operations further comprise:
excavating, by the excavator, the material pile based on the generated three-dimensional model of the material pile.

12. The apparatus according to claim 8, wherein the performing three-dimensional reconstruction based on the sequence of depth images of the material pile, to generate a three-dimensional model of the material pile comprises:
converting the sequence of depth images of the material pile into a sequence of three-dimensional point clouds;
fusing the sequence of three-dimensional point clouds based on overlaps of adjacent images in the sequence of depth images, to obtain a fused three-dimensional point cloud of the material pile; and
generating the three-dimensional model of the material pile based on the three-dimensional point cloud of the material pile.

13. The apparatus according to claim 8, wherein the excavating, by the excavator, the material pile based on the generated three-dimensional model of the material pile comprises:
planning, according to the three-dimensional model of the material pile, an excavation operation for excavating the material pile; and
excavating, by the excavator, the material pile according to the generated excavation operation.

14. A computer-readable medium, storing a computer program thereon, wherein the program, when executed by a processor, causes the processor to perform operations applied to an unmanned autonomous excavator, where a binocular camera is provided on each of two side-surfaces of the excavator, and the two side-surfaces of the excavator are parallel to an advancing direction of the excavator, the operations comprising:

in response to detecting an instruction for controlling an excavator body of an excavator to rotate to transport materials shoveled from the material pile, determining a side-surface turned to the material pile in the two side-surfaces according to a rotation direction of the excavator body, and performing a turning on operation on a binocular camera provided on the determined side-surface of the excavator while keeping a binocular camera provided on the other side-surface of the excavator in a turned off sate;

acquiring a sequence of depth images of the material pile collected by the turned on binocular camera provided on the determined side-surface of the excavator; and     performing three-dimensional reconstruction based on the sequence of depth images of the material pile, to generate a three-dimensional model of the material pile.

15. The medium according to claim 14, wherein acquiring a sequence of depth images of the material pile collected by the turned on binocular camera provided on the determined side-surface of the excavator comprises:

acquiring the sequence of depth images of the material pile, the sequence of depth images of the material pile being collected by the binocular camera during rotation of the excavator body to transport materials shoveled from the material pile, wherein the rotation of the excavator is with a vertical line perpendicular to the ground as an axis and the front-side of the excavator body turns away from the material pile during the rotation of the excavator body.

16. The medium according to claim 15, wherein the operations further comprise:

excavating, by the excavator, the material pile based on the generated three-dimensional model of the material pile.

17. The medium according to claim 15, wherein the operations further comprise:

in response to detecting an instruction for controlling a bucket of the excavator to unload materials, turning off the binocular camera provided on the determined side-surface of the excavator.

18. The medium according to claim 14, wherein the performing three-dimensional reconstruction based on the sequence of depth images of the material pile, to generate a three-dimensional model of the material pile comprises:

converting the sequence of depth images of the material pile into a sequence of three-dimensional point clouds;

fusing the sequence of three-dimensional point clouds based on overlaps of adjacent images in the sequence of depth images, to obtain a fused three-dimensional point cloud of the material pile; and     generating the three-dimensional model of the material pile based on the three-dimensional point cloud of the material pile.

19. The medium according to claim 14, wherein the excavating, by the excavator, the material pile based on the generated three-dimensional model of the material pile comprises:

planning, according to the three-dimensional model of the material pile, an excavation operation for excavating the material pile; and     excavating, by the excavator, the material pile according to the generated excavation operation.

\* \* \* \* \*